United States Patent
Portman et al.

(10) Patent No.: US 9,258,134 B2
(45) Date of Patent: Feb. 9, 2016

(54) SYSTEM AND METHOD FOR RECORDING COMMUNICATION INTERACTION OVER A MOBILE DEVICE

(75) Inventors: Leon Portman, Rishon Lezion (IL);
Asaf Shalom, Rishon Le Zion (IL);
Michael Vainer, Ashdod (IL); Shay Weiss, Ra'anana (IL)

(73) Assignee: NICE-SYSTEMS LTD., Ra'anana (IL)

( * ) Notice: Subject to any disclaimer, the term of this patent is extended or adjusted under 35 U.S.C. 154(b) by 26 days.

(21) Appl. No.: 12/902,938

(22) Filed: Oct. 12, 2010

(65) Prior Publication Data

US 2012/0088475 A1    Apr. 12, 2012

(51) Int. Cl.
*H04M 1/00* (2006.01)
*H04L 12/18* (2006.01)

(52) U.S. Cl.
CPC .................................. *H04L 12/1831* (2013.01)

(58) Field of Classification Search
None
See application file for complete search history.

(56) References Cited

U.S. PATENT DOCUMENTS

| | | | |
|---|---|---|---|
| 2001/0005372 A1* | 6/2001 | Cave et al. | 370/401 |
| 2005/0185772 A1* | 8/2005 | Chen | H04L 12/66 379/88.19 |
| 2007/0060096 A1* | 3/2007 | Hayakawa | 455/403 |
| 2007/0121880 A1* | 5/2007 | Stillman | H04M 3/42229 379/218.01 |
| 2007/0211876 A1* | 9/2007 | Othmer et al. | 379/201.01 |
| 2008/0253543 A1* | 10/2008 | Aharon | 379/201.12 |
| 2008/0298560 A1* | 12/2008 | Purdy et al. | 379/88.17 |
| 2009/0028132 A1* | 1/2009 | Portman et al. | 370/352 |
| 2010/0104074 A1* | 4/2010 | Yang | 379/88.13 |
| 2010/0173618 A1* | 7/2010 | Kass | H04M 3/42221 455/414.1 |
| 2011/0076990 A1* | 3/2011 | Silva | 455/412.1 |
| 2011/0216896 A1* | 9/2011 | Martin, II | H04M 1/656 379/265.06 |

OTHER PUBLICATIONS

WO 2008/102055 Published Aug. 28, 2008.*
WO 01/82572 Published Nov. 2001.*

* cited by examiner

*Primary Examiner* — Dai A Phuong
(74) *Attorney, Agent, or Firm* — Pearl Cohen Zedek Latzer Baratz LLP

(57) ABSTRACT

A system includes a recording server connected to a private branch exchange (PBX) and/or an interface device, where the connected PBX and/or interface device are each connected to an electronic communication network. The PBX provides at least a first portion of a mobile communication on the electronic communication network to the recording server, and the interface device provides a second portion of the mobile communication to the recording server, wherein the recording server, the PBX, and, if connected to the recording server, the interface device are each assigned to a same organization. A method provides a mobile device and a PBX each registered to an organization, a smart client enforces a policy regarding at least one of incoming mobile communications and outgoing mobile communications on the mobile device, providing a recording server connected to the PBX and simulating an extension of the PBX, conferencing a recording server and recording content.

14 Claims, 7 Drawing Sheets

INVITE sip:9123456@10.240.3.10:5060 SIP/2.0
From: <sip:0541234567@10.226.240.3>;tag=35e195d2-947d-4585-946f-
098392474d66-91866485
To: <sip:Recorder@10.240.3.10>
Call-ID: d253c800-b0d1ea39-4a7dd-3f0e20a@10.226.240.3
CSeq: 101 INVITE
Date: Thu, 26 Nov 2009 02:38:49 GMT
User-to-User: A20101A10A30353437363534333231;encoding=hex;
Supported: timer
Supported: replaces
User-Agent: Mobile-App
Max-Forwards: 70
Allow:
INVITE,OPTIONS,INFO,BYE,CANCEL,ACK,PRACK,UPDATE,REFER,SUBSC
RIBE,NOTIFY,PUBLISH
Allow-Events: presence,kpml
Min-SE: 90
Contact: <sip:2000@10.226.240.3:5060;transport=tcp>;isfocus
Via: SIP/2.0/TCP 10.226.240.3:5060;branch=z9hG4bKdf6b622b648d9
Session-Expires: 1800

FIG. 3

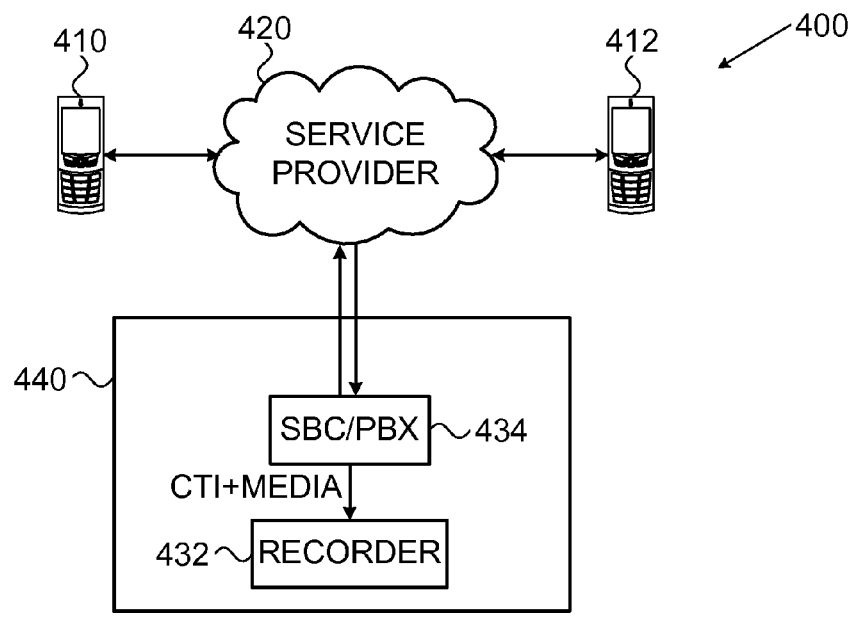

FIG. 4

SYSTEM AND METHOD FOR RECORDING COMMUNICATION INTERACTION OVER A MOBILE DEVICE

FIELD OF THE INVENTION

This application relates to recording communication interaction and, in particular, to a system and method for recording communication interaction over a mobile device.

BACKGROUND

Although the use of mobile devices (e.g., cell phones, personal digital assistants, tablet (pad) computers, etc.) has crept its way into the enterprise environment through individual users, it has recently become a standardized offering in many companies. In North America, Fortune 1000 companies may support the use of, and pay for, cellular services for their employees and may have even moved from individual to corporate liability.

The expanded use of mobile devices may have the impact of taking some traffic and connections away from the traditional fixed enterprise systems to the cellular network. IP telephony may include the integration of mobile phones with the enterprise telephony system, rather than keeping it separate. Mobile phones may become even more prevalent and replace desktop voice hardware as they become the primary device. In the future, it could be that enterprises may be supporting more mobile phones than desktop phones in North America.

Companies may be required to record and store interaction over mobile devices in the same manner which may be done today for standard voice conversation, but with the added challenge of mobility capabilities.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 depicts a protocol message in accordance with an embodiment of the invention;

FIG. 4 depicts a schematic of a system in accordance with an embodiment of the invention;

Figure 1:
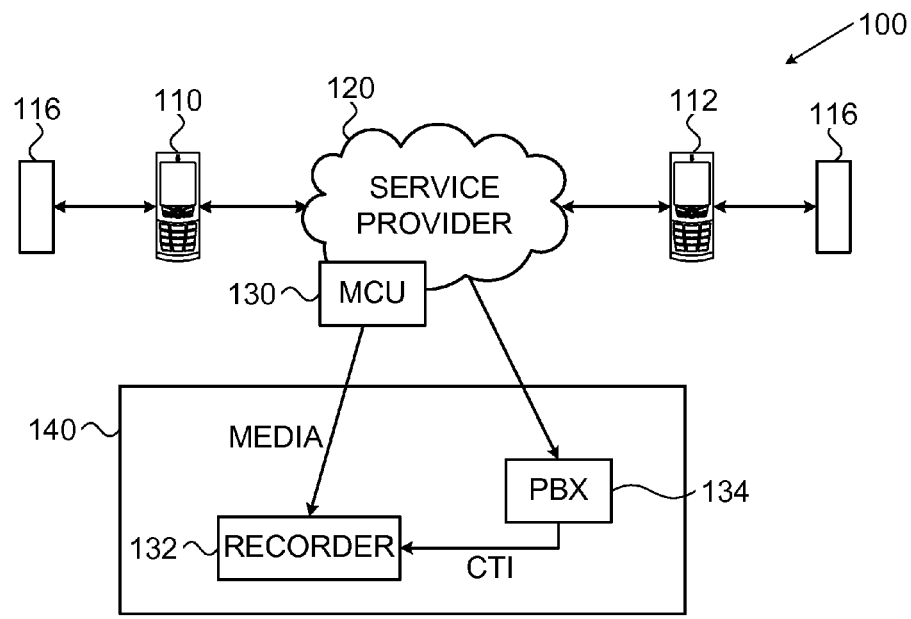
FIG. 1 depicts a schematic of a system in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, specific examples are set forth in order to provide a thorough understanding of at least one embodiment of the invention. However, it will also be apparent to one skilled in the art that other embodiments of the invention are not limited to the examples described herein. Furthermore, well-known features may be omitted or simplified in order not to obscure embodiments of the invention described herein.

Unless specifically stated otherwise, as apparent from the following discussions, it is appreciated that throughout the specification, discussions utilizing terms such as "selecting," "evaluating," "processing," "computing," "calculating," "associating," "determining," "designating," "allocating" or the like, refer to the actions and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, network or other apparatus. Embodiments of the invention described herein are not described with reference to any particular programming language, machine code, etc. It will be appreciated that a variety of programming languages, network systems, protocols or hardware configurations may be used to implement the teachings of the embodiments of the invention as described herein. In some embodiments, one or more methods of embodiments of the invention may be stored as instructions or code in an article such as a memory device, where such instructions upon execution by a processor or computer result in the execution of a method of an embodiment of the invention.

This application relates to systems and methods for recoding communication involving mobile communication devices, and in particular, mobile telephones. Such methods include conference-based recording and call-anchoring recording. Because there may not necessarily be a standard for mobile environments, methods embodying the present invention may be adaptable to at least a user's enterprise telephony environment and marketplace acceptance.

Unlike in conventional communication environments, data from mobile interactions may not be easily accessible. One reason may be that the mobile communication's data stream can be routed through multiple, different locations as the communication's participant(s) move about. Conventional methods of recording may be done directly by end-point (which may not be acceptable for compliancy recording), or by service provider solutions, which may also not be acceptable because sensitive recordings are stored outside of the enterprise's borders and dominion.

A mobile communication recording solution embodying the present invention may have the capability of tracking and recording the mobile communication's information and content, for example: audio and/or video content, file attachments, call detail records, etc. Because of compliance requirements (security law, e-discovery, etc.), incoming and outgoing calls from mobile devices may be blocked if they cannot be recorded. Due to privacy considerations, it may be desirable to not record calls to/from/between certain, predetermined device numbers, for example, personal calls.

Conference-Based Recording

FIG. 1 schematically depicts system 100 that may implement conference-based recording in accordance with an embodiment of the invention. System 100 may include two, or more, participants using mobile device 110, 112 engaged in a mobile communication. The mobile device may be a cellular phone, a personal digital assistant (PDA), a notebook computer, a netbook, a laptop computer, a personal computer, a workstation, a tablet (pad) computer, etc.).

Mobile device 110, 112 may be connected through an electronic communication network 120 provided by, for example, a service provider. Mobile device 110, 112 and other mobile devices may be assigned to an organization (e.g., a company, an enterprise, etc.), which may designate a service provider to allow communication over electronic communication network 120. Communication may be between mobile devices assigned to the organization, or between a mobile device(s) assigned to the organization and a communication device(s) (mobile or landline) not assigned to the organization.

For conference-based recording, a multipoint conferencing unit (MCU) 130 may be added as a participant to each call to/from mobile device 110, 112. The MCU can be a stand alone MCU or may be part of the generic Media Server. A simple MCU may be embedded in the mobile device itself. The MCU may act as an interface device that may manage a multipoint conference by connecting the multiple sites and stations in the same conference. The MCU may combine video, audio and data streams from multiple conference endpoints (e.g., mobile device 110, 112) into one multi-location, interactive session. MCU 130 provides recording server 132 with media (e.g., data, images, file(s), and/or video) that is part of the electronic communication between mobile device 110, 112 and another communication device. Recording server 132 may be located within organization data center 140. The recording server may simulate an extension, or group of extensions, which are defined (and registered) in the organization's private branch exchange (PBX) 124.

Recording server 130 may be defined as an extension, or group of extensions (in terms of routing patterns), inside the organization. When a call that may need to be recorded takes place on mobile device 110, 112, the mobile device conferences recording server 130 into the call by dialing the recording server's predefined number (i.e., direct inward dialing (DID), also called direct dial-in (DDI) number). Dialing by the mobile device may be either automatic or manually performed. The predefined number may be any identifier assigned to a mobile device, for example a telephone number, network address, IP address, SIM serial number, service-subscriber key (IMSI), etc. Typically, the identifier may be a unique identifier for the mobile device, but it need not be unique.

The DID service may provide one or more trunk lines to the organization for connection to PBX 134. As calls are presented, PBX 134 may route an audio portion of the communication to recording server 132 using computer telephony integration (CTI) protocols. PBX 134 may also route media portions of the communication to the recording server as well. Recording server 132 may accept the call and receive the media and audio information.

A smart client may be installed on each mobile device 110, 112. Smart client 116 may have visibility to every incoming and outgoing call from the mobile device. The smart client may enforce a white list/blacklist policy regarding the calls themselves. The white list/blacklist policy may review the calling/called party to determine if the call should be recorded or not.

Figure 2:
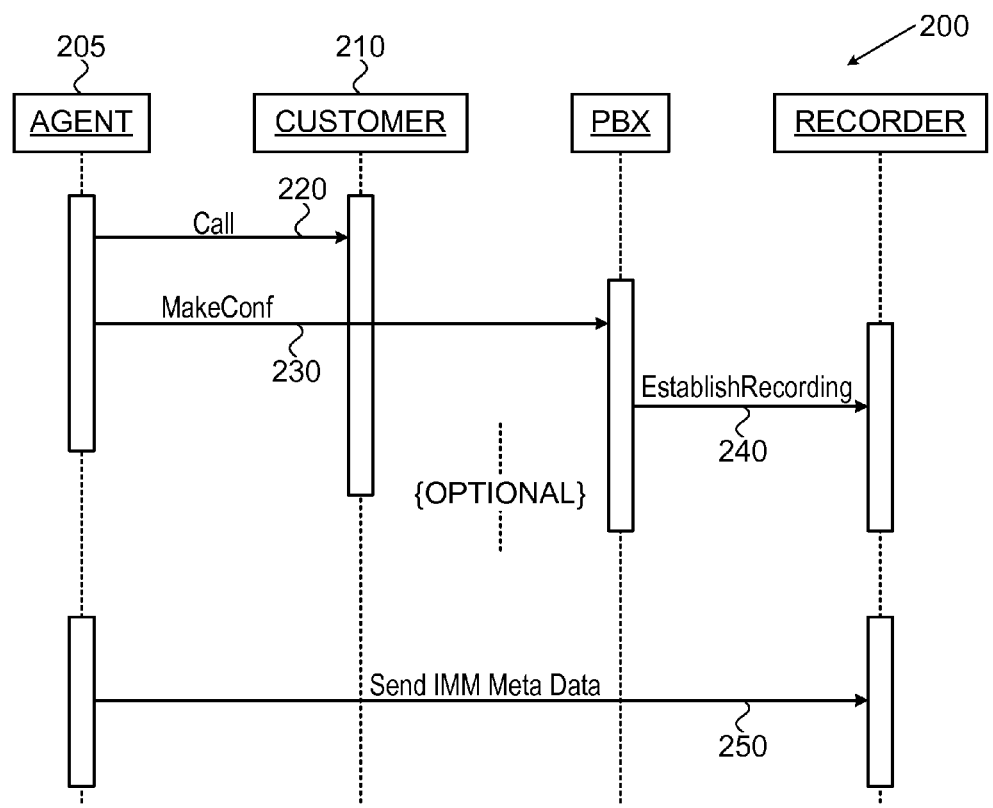
FIG. 2 depicts a sequence diagram in accordance with the embodiment of FIG. 1.

FIG. 2 depicts a diagram of sequence 200 in accordance with conference-based recording as may be implemented by system 100. The sequence of a conference-based recording session may be as follows:

1. A mobile worker of the organization, for example agent 205, uses the organization's registered mobile device 110, 112 to initiate a call 220 to, perhaps, customer 210 of the organization. Sequence 200 may also be implemented, for example, when call 220 is directed to another agent or worker of the organization.

2. Smart client 116, which may be installed on the mobile device, may enforce a policy regarding incoming and/or outgoing calls on the mobile device by comparing the dialed and/or the dialing number to the white list/blacklist policy to make a decision regarding whether call 220 should be recorded based on the white list and blacklist.

3. If call 220 should be recorded, smart client 116 may conference an extension of the organization through MCU 130 and/or PBX 134 into call 220, so that call 220 may be recorded on recording server 132.

4. Call 220 may be established between agent 205, the destination party (e.g., customer 210), and recording server 132.

5. Information and/or content from call 220 on the mobile device may be recorded through the extension onto recording server 132.

Recording server 132 may be able to collect basic metadata information of call 220 (e.g., calling and call parties, call date and time, etc.). This metadata, and other metadata, can be delivered to the recording server as CTI events through the PBX or the mobile device itself, and attached later to the recorded call in recording server 132. Once recorded, the information can be treated as a standard call within a call center playback program, for example any compliance communication recording system. The recorded call can be accessed by the call center's system for archiving, playback, quality management, and analytics.

Although described as using standard Session Initiation Protocol (SIP), embodiments of the invention are not limited to a particular protocol and can be easily implemented in any other telephony communication protocol—for example, H.323, Inter-Asterisk eXchange (IAX), Jingle, and others.

The mobile device of the agent may be identified as the calling number (i.e., conferencing device) and may be reported in the "From" header of an INVITE message. In the conference-based recording model, it may be that the telephony environment can not manipulate SIP headers.

FIG. 3 depicts an example of SIP protocol message 300 in accordance with an embodiment of the invention containing a User-To-User header that may provide additional information regarding the calling party and the direction of the mobile interaction. Additional information regarding the call participants can be provided by custom header information according to the following:

Information regarding the second party of the call (e.g., customer 210) may be provided using a custom header, for example a User-To-User header.

Additional information on the call may be provided through a CTI interface, for example using a standards-based protocol for describing communication sessions metadata (start/end times, participants etc.). For example, IMM protocol is XML-based and can be reported over SIP, HTTP, and web services.

The additional call information may be provided via IMM by other components of a contact center (e.g., smart media gateways, interactive voice response technology, session border controllers, endpoints, etc.). A distributed CTI concept may address receiving CTI from distributed components instead of one centralized CTI server. The distributed CTI concept leverages SIP and service oriented architecture (SOA) web services technologies to receive CTI information from CTI capable components to the recording system. In a distributed call center, CTI can be reported from endpoints, or contact center components that may be incapable of supporting comprehensive CTI information.

The User-To-User header may provide additional basic information on the call. For instance, the User-To-User header may include custom information that can be shared between two endpoints of the call, for example the mobile application initiating the conference and the recording server.

The following header encoding may be used for information about a remote party and the direction of the call:

The User-to-User Information (UUI) encoding format may be set as a hexadecimal string; however other notational systems may be used. The first byte may be the field type which can be one of the following:
1. Remote Party Identifier—0xA1
2. Direction—0xA2 with possible values:
a. 0 for INCOMING
b. 1—for OUTGOING
c. 2—for INTERNAL The second byte may set the field size.

The encoded hexadecimal string may begin at the third byte. Encoding may be in ASCII or other encoding formats.

In the UUI example depicted in FIG. 3, A20101A10432303030, the direction is OUTGOING and the remote party is 2000 (HEX ASCII encoding). A2 is Call Direction Type, 01 is the size to read and 01 is OUTGOING. A1 is Remote Party ID, 04 is the size and 2000 is encoded in ASCII as 32303030. The example message depicted in FIG. 3 details that an outgoing call is taking place between the agent's mobile phone (0541234567) and the customer's mobile phone (0547654321).

Anchor-Based Recording

FIG. 4 schematically depicts system 400 that may implement anchor-based recording in accordance with an embodiment of the invention. System 400 may include two, or more, participants using mobile device 410, 412 engaged in a mobile communication. The mobile device may be a cellular phone, a personal digital assistant (PDA), a notebook computer, a netbook, a laptop computer, a personal computer, a workstation, a tablet (pad) computer, etc.).

Mobile device 410, 412 may be connected through an electronic communication network 420 provided by, for example, a service provider. Mobile device 410, 412 and other mobile devices may be assigned to an organization (e.g., a company, an enterprise, etc.), which may designate a service provider to allow communication over electronic communication network 420. Communication may between mobile devices assigned to the organization, or a mobile device(s) assigned to the organization and a communication device(s) (mobile or landline) not assigned to the organization.

System 400 may implement a call anchoring scenario by routing information through a device, for example a mobile gateway, so as to enable access to mobile calls. The device, which may be located within the carrier cloud, can forward or span the traffic to a third destination, for example a recording server.

One difference between anchor-based and conference-based recording may be in the original route of an on-going call. An original call between the mobile user and the destination under conference-based recording may not change and the recording may enabled by generating an additional stream from the mobile device to the recording server. An original call under anchor-based recording may be diverted from what would be its original path to a device which enables recording by either providing a passive span or can conferencing the recording server to the call.

Organization data center 440 may include recording server 432 connected to electronic communication network 420 through session border controller (SBC) and/or private branch exchange (SBC/PBX) 434. The SBC may also be known as a session manager, a border element, a communication firewall, and a security gateway. The session border controller may act as an interface device and may be used to control registration of mobile devices outside of the organization so that the ports on a far end firewall or router are kept open.

Because traffic on system 400 may be routed through the mobile gateway, it may be possible to initiate total or rule-based recording using standard SIP formats to indicate where to send the captured information. Once recorded, the information can be treated as a standard call within a call center playback program, for example Nice System's PERFORM® system. The recorded call can be accessed by the call center's system for archiving, playback, quality management, and analytics.

In one embodiment, because the carrier may not be involved in session initiation, and information in the SIP message may not be used for call routing, the SIP messaging may be performed between mobile device 410, 412 via SBC/PBX 434 and recording server 432. Therefore, rich information about a mobile communication may be passed to the recording server for recordation with other communication data and metadata.

In this embodiment, the standard SIP headers can be manipulated to permit a less confining implementation. For example, the User-To-User header may be discarded, and the "To" & "From" SIP headers can be set with the caller and called parties' identifications. However, by discarding the User-to-User header, determination as to whether the call is between two of the organization's agents may not be practical.

Figure 5:
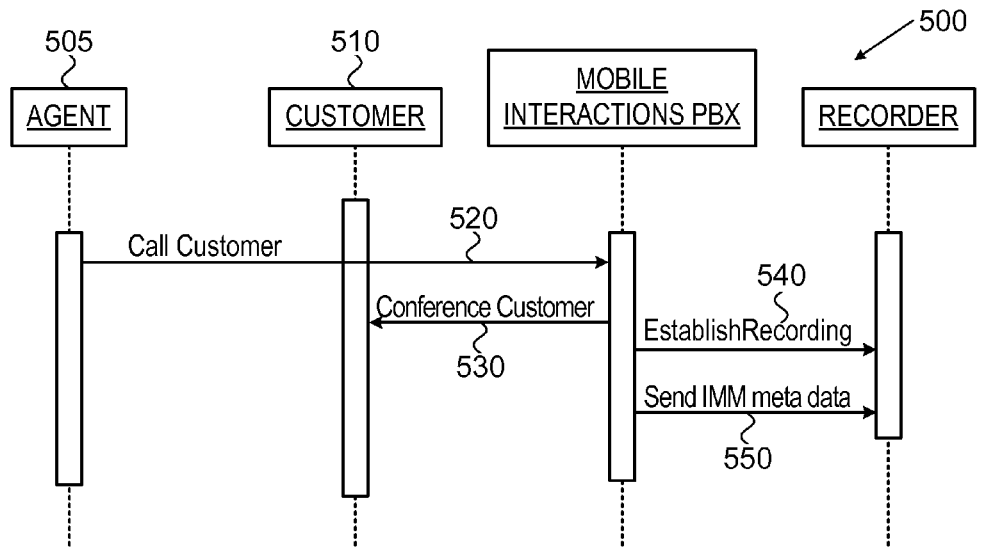
FIG. 5 depicts a sequence diagram in accordance with the embodiment of FIG. 4.

FIG. 5 depicts a diagram of sequence 500 in accordance with anchor-based recording as may be implemented by system 400. The sequence of an anchor-based recording session may be as follows:

1. A mobile worker of the organization, for example agent 505, uses the organization's registered mobile device 410, 412 to initiate call 520 to, perhaps, customer 510 of the organization. Sequence 500 may also be implemented, for example, when the call is directed to another agent or worker of the organization.

2. Smart client 416, which may be installed on the mobile device, may enforce a policy regarding incoming and/or outgoing calls on the mobile device by comparing the dialed and/or the dialing predefined identifier number to the white list/blacklist policy to make a decision regarding whether call 520 should be recorded. In some embodiments, the smart client may be located within organization data center 440.

3. Call 520 may be routed by a mobile gateway device in electronic communication network 420 to the organization's PBX 434. The PBX may initiate conference call 530 to the destination party (e.g., customer 510, or another agent in the organization). PBX 434, based on the evaluation performed by the smart client, may also conference in recording server 432 by establishing a recording session 540.

4. PBX 434 may provide metadata information on/from the call to the recording server 434 via an IMM protocol message 550.

General Considerations

Both conference-based recording and anchor-based recording may implement support for a Session Timer according to Internet Engineering Task Force RFC 4028 (Session Timers in the Session Initiation Protocol (SIP)). The conferencing entity (e.g., agent 205, 405, PBX 434) may be able to accept a re-Invite or UPDATE request from recording server 232, 432 with an updated session description protocol as part of the session timer mechanism. The re-Invite or UPDATE requests may be made for periodic refresh of SIP sessions to determine whether the session is still active.

Both conference-based recording and anchor-based recording may implement support for key press markup language (KPML) via monitoring of dual tone multi-frequency (DTMF) signals over SIP sessions according to Internet Engineering Task Force RFC 4730 (A Session Initiation Protocol (SIP) Event Package for Key Press Stimulus (KPML)). Every entity that is involved in establishing a SIP session may implement the support for KPML, including either the recorder and/or the PBX. The KPML may use a Subscribe/Notify mechanism to get DTMF signals from the agent (where applicable, the implementing vendor).

Figure 6:
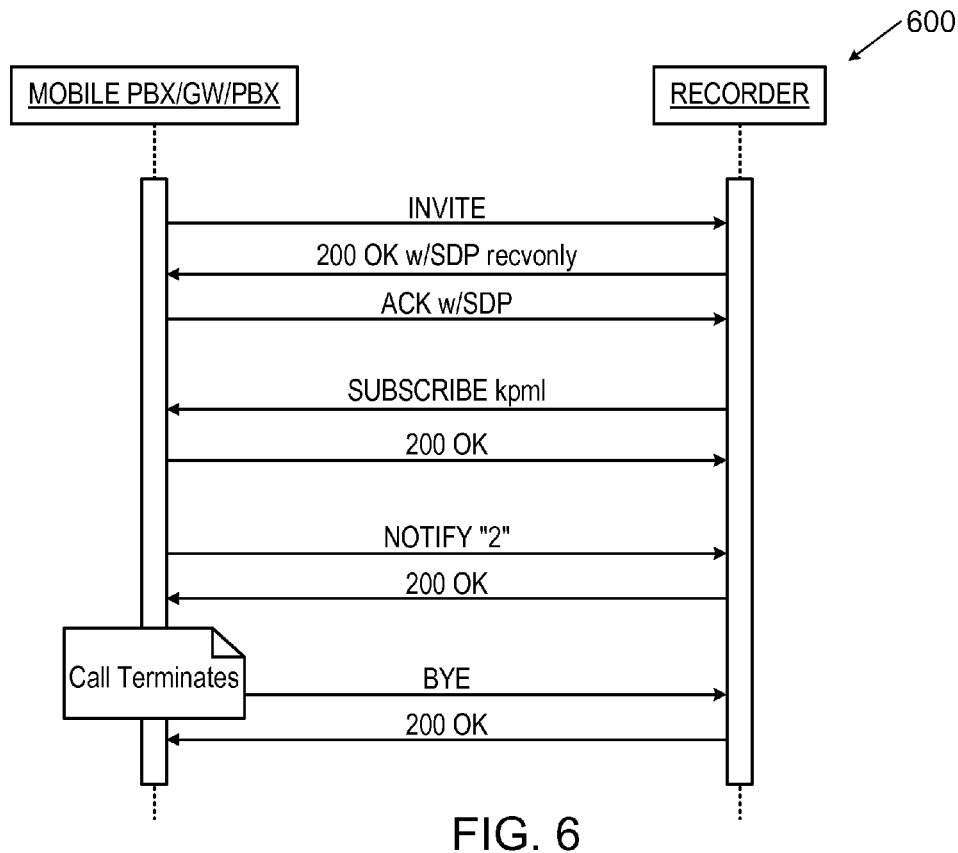
FIG. 6 depicts a sequence diagram in accordance with an embodiment of the invention.

FIG. 6 depicts a diagram of sequence 600 that may implement a new call scenario supporting DTMF notifications in accordance with an embodiment of the invention. For clarity, FIG. 6 depicts only those interactions between the PBX and recorder for reporting in-call KPML events. All other sequences steps remain the same as depicted in FIG. 5. Because FIG. 6 describes the SIP sequence between the PBX and the recorder it may be relevant for both conference-based and anchor-based recordings, accordingly all other entities behind the PBX are not shown in FIG. 6.

Figure 7:
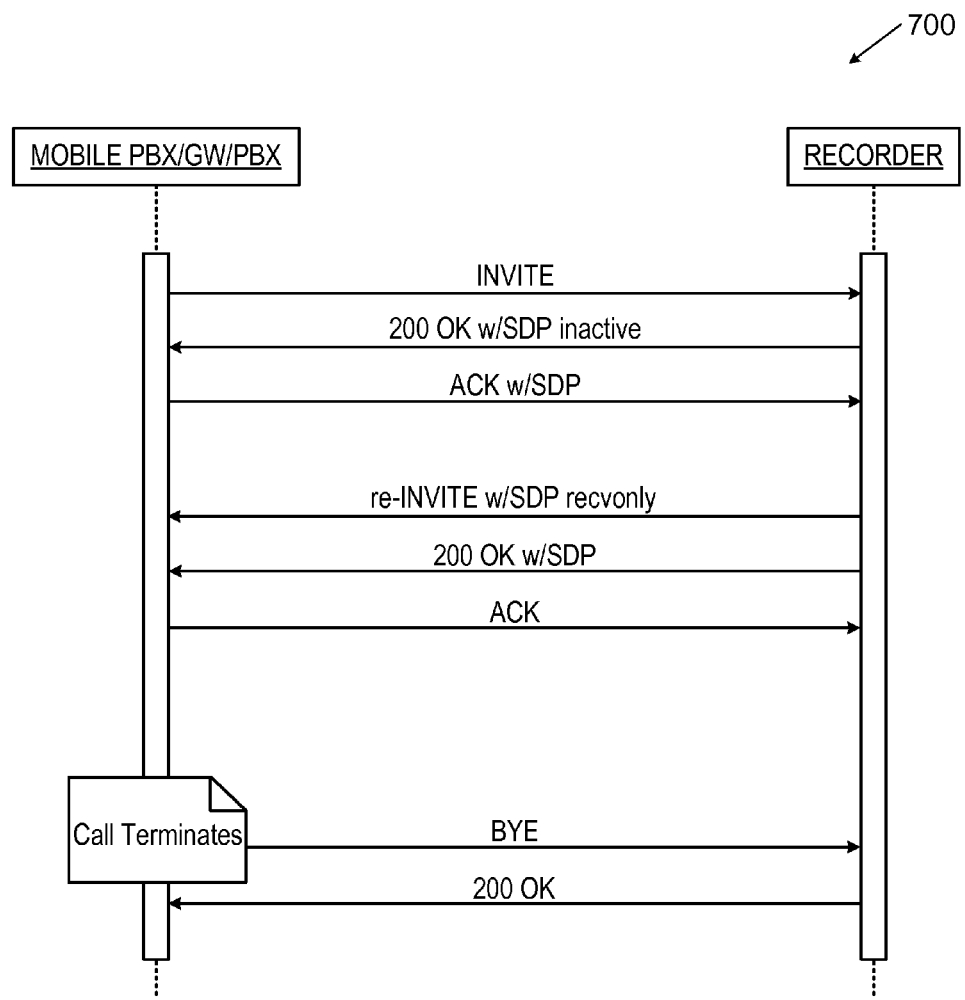
FIG. 7 depicts a sequence diagram in accordance with an embodiment of the invention.

Both conference-based recording and anchor-based recording may implement support for inactive/receive only attributes in SDP+re-INVITE for media update.

a. When the conferencing entity sends INVITE to the recording server, a response may be a=inactive attribute as part of the SDP in the standard response for successful HTTP requests (i.e., 200 OK response). A re-INVITE may be sent in order to update the conferencing unit with the updated SDP. FIG. 7 depicts a diagram of sequence 700 that may implement a recorder that responds with a SDP that contains a=inactive plus a media information update with a re-Invite message in accordance with an embodiment of the invention. Because a call may be established without receiving real-time protocol (RTP) streams—the call can be used in a record-on-demand environment where the decision to record the call can come after the call is established. In this case call will be answered with "inactive" SDP and later when the recorder decides to record the call it will send "reInvite" with relevant SDP. The flow depicted in FIG. 7 presents a solution for Pause/Resume and Record on demand scenario, where a recording session is initiated however media will be sent only upon request. Standard SIP mechanisms can indicate in SDP that media can be active (recording in progress), or inactive (recording paused) without any additional control interfaces.
  b. Because the recording server may receive RTP streams from a gateway, the 200 OK response may contain a SDP with a=recvonly attribute.

Both conference-based recording and anchor-based recording may implement support so that the "From" header field may contain the agent's ID. The Agent ID can be used to correlate between the agent and the destination channel SDP in the 200 OK response.

Both conference-based recording and anchor-based recording may implement support for passing basic CTI information (e.g., remote party ID and direction) in User-To-User SIP headers within an INVITE request.

As described above, for anchor-based recording the User-To-User header may be discarded and support may be implemented to set the "To" and "From" SIP header fields with the caller and called parties' identification.

Anchor-based recording may send two streams to the recorder (e.g., RX and TX) separately. A Voice Recording SIP Proxy (VRSP) (e.g., a SIP load balancer in front of a recording server) may respond with two media descriptors in the SDP body of the 200 OK response. The first media descriptor in the SDP may assume RX and the second one may assume the TX. Both media descriptors may have a=recvonly attribute.

A prerecorded announcement may be played once recording starts, in which case there may be a possibility that the recording logger will send RTP data to the PBX. In that case, the recording server may add a=sendonly attribute to SDP's media descriptor. The prerecorded announcement may contain a beep and/or audio indicating that the mobile communication is being recorded.

Figure 8:
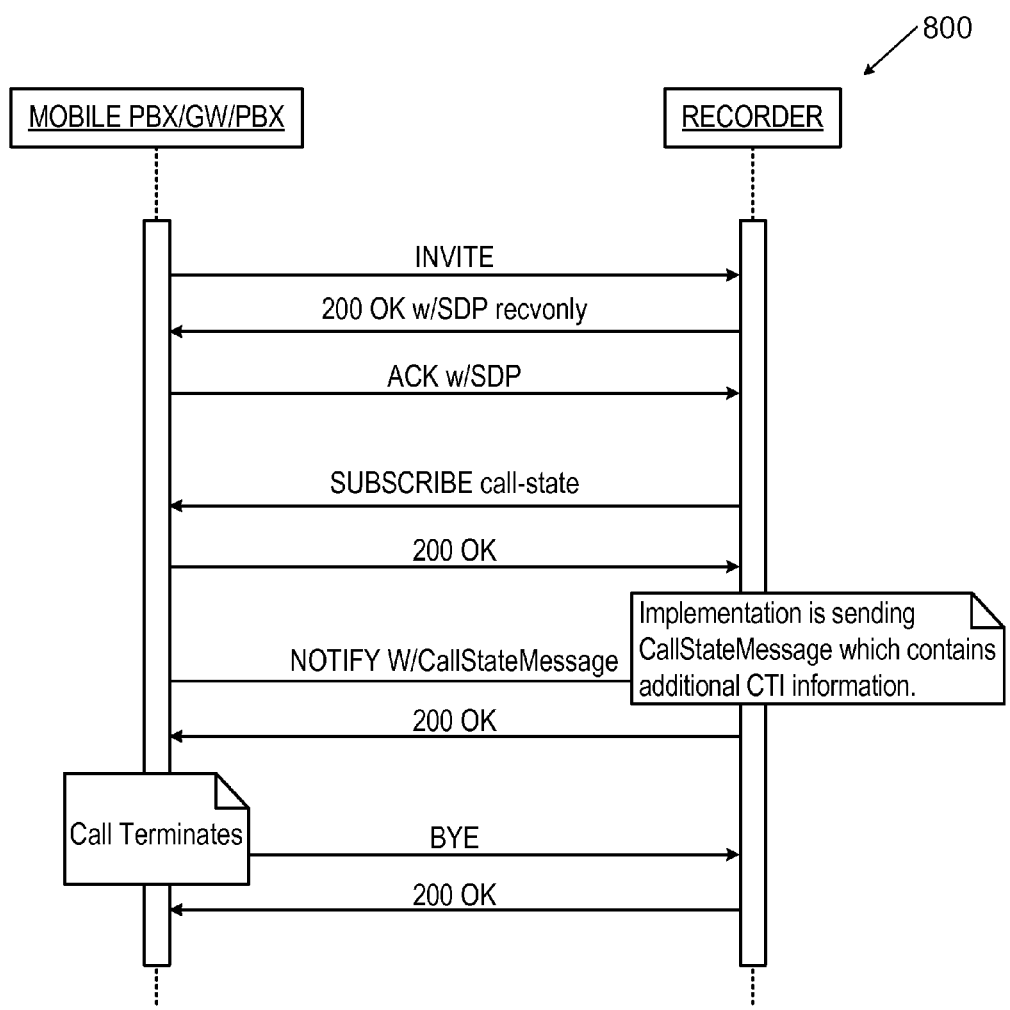
FIG. 8 depicts a sequence diagram in accordance with an embodiment of the invention.

Because SIP is used for session initiation, in one embodiment a CallStateMessage containing additional CTI information may be sent to support further call metadata recording capabilities. For example, one way may be to receive CTI/CDR (call detail records) information from additional CTI sources, which perhaps can be provided by a mobile application or PBX. One such implementation may use the Nice System's IMM protocol. Any additional information may be passed as part of the NICE IMM event: com.nice.call-state. The IMM protocol may use SIP Subscribe/Notify messages in order to get the CTI information. A description of SIP subscribe/notify mechanism is described in Internet Engineering Task Force RFC 3265 (Session Initiation Protocol (SIP)—Specific Event Notification). FIG. 8 depicts a diagram of sequence 800 that may implement an IMM call state event package to send additional CTI information to a recorder in accordance with an embodiment of the invention. In particular, FIG. 8 represents an initiation and termination of metadata subscription for the IMM protocol mentioned above (Invite:—PBX connects to recorder; Subscribe:—recorder subscribes on IMM notifications; Notify: PBX notifies the recorder on the call start).

Figure 9A:
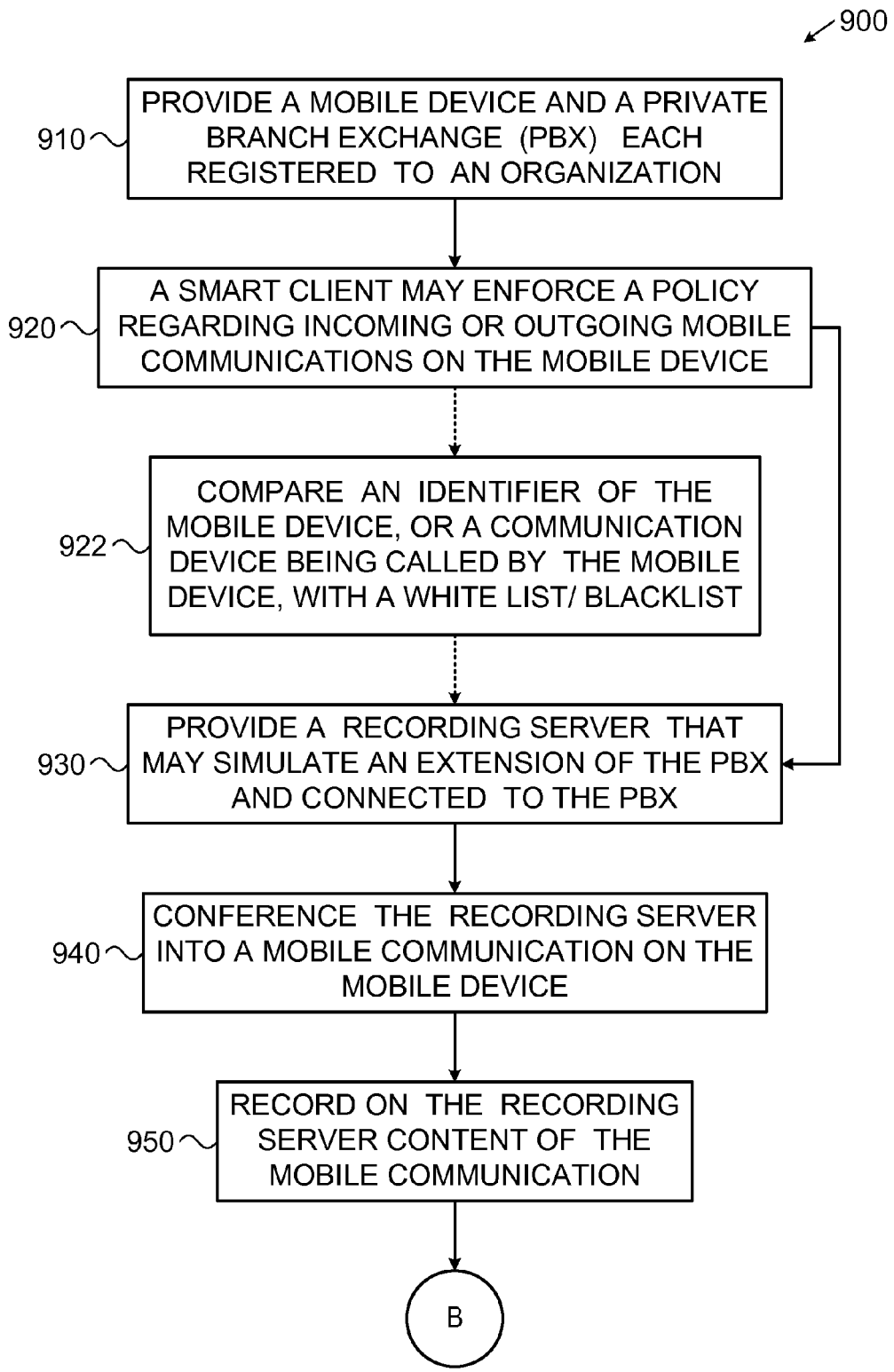
FIGS. 9A and 9B depict a method in accordance with an embodiment of the invention.
Figure 9B:
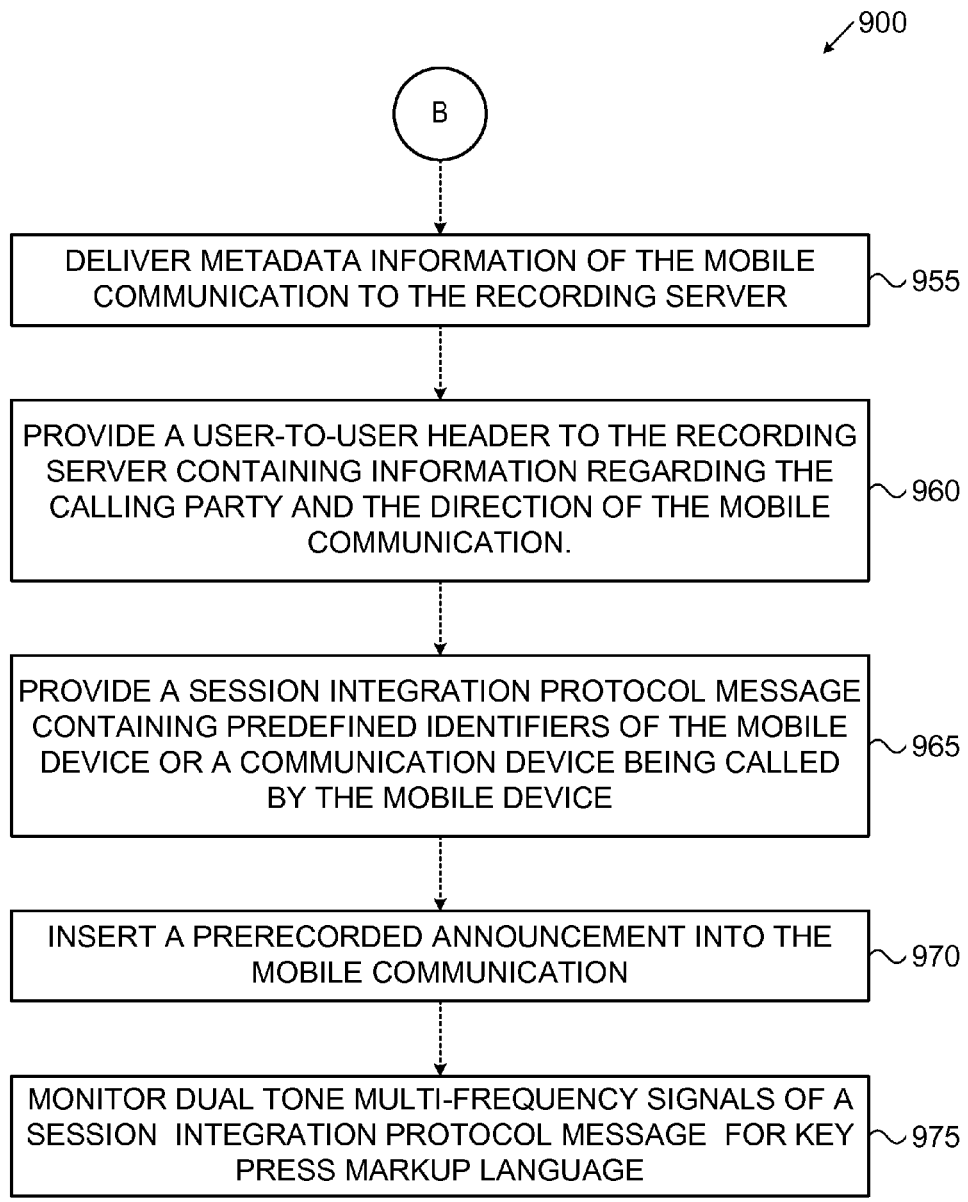

FIGS. 9A and 9b depict process 900 that may record communication content between a mobile device and one or more communication devices in accordance with an embodiment of the invention. Process 900 provides a mobile device and a private branch exchange (PBX), step 910. Each of the mobile device and the PBX may be registered to an organization, and each may be capable of coupling to an electronic communication network.

A smart client may enforce, step 920, a policy regarding incoming mobile communications and/or outgoing mobile communications on the mobile device. In one embodiment of the invention, enforcement of the policy by the smart client may include comparing a predefined identifier of the mobile, and/or a predefined identifier of a communication device being called by the mobile device, with a white list/blacklist. The white/blacklist may be stored in the smart client, or may be stored in a memory at the organization data center and be accessible to the smart client over the electronic communication network. After step 922, process 900 may continue at step 930.

At step 930, process 900 may provide a recording server connected to the PBX. The recording server may simulate an extension of the PBX. The recording server may be conferenced into a mobile communication on the mobile device, step 940. The mobile communication may be between two or more parties, where only one party need be a mobile device and only one party (the mobile device or another party) need be registered with the organization.

The recording server may record, step 950, the content and/or information of the mobile communication.

In an embodiment of the invention, process 900 may include one or more of the following steps. Process 900 may deliver, step 955, metadata information of the mobile communication to the recording server. The metadata may describe the definition, structure, administration, etc. of the content of the mobile communication.

Process 900 may provide, step 960, a user-to-user header to the recording server containing information regarding a calling party and a direction of the mobile communication.

Process 900 may provide, step 965, a session integration protocol message containing predefined identifiers of the mobile device and/or a communication device, or devices, being called by the mobile device.

Process 900 may insert, step 970, a prerecorded announcement into the mobile communication. The prerecorded announcement may, for example, inform call participants that the communication is being recorded, and/or may be a series of periodic beeps to alert participants to the recording of the call.

Process 900 may monitor, step 975, dual tone multi-frequency signals of a session integration protocol message for key press markup language.

While there have been shown and described fundamental novel features of the invention as applied to several embodiments, it will be understood that various omissions, substitutions, and changes in the form, detail, and operation of the illustrated embodiments may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method for recording communications of mobile devices, the method comprising:
   receiving a notification by a smart client installed on a mobile device assigned to an organization regarding an incoming or outgoing mobile communication;
   comparing by the smart client installed on the mobile device a dialed number or a dialing number associated with the mobile communication to a predefined list of telephone numbers;
   deciding by the smart client according to a policy and based on the predefined list if to record the mobile communication;
   if the mobile communication is to be recorded, conferencing into the mobile communication by the smart client via an extension of a remote private branch exchange (PBX) of the organization, a recording server that is connected to the PBX;
   recording, on the recording server, media of the mobile communication received at the recording server content of the mobile communication;
   providing a user-to-user header to the recording server containing information regarding a calling party and a direction of the mobile communication, wherein the user-to-user header is capable of encoding the direction as incoming and outgoing; and
   sending during the communication call metadata by the installed smart client to the recording server, the metadata comprising data regarding the call parties and the time of the call, and wherein the metadata is computer telephony integration information and sent using session initiation protocol messages.

2. The method of claim 1, further including providing a session integration protocol message containing predefined identifiers of at least one of the mobile device and a communication device being called by the mobile device.

3. The method of claim 1, further comprising inserting into the mobile communication a prerecorded announcement.

4. The method of claim 1, further comprising monitoring dual tone multi-frequency signals of a session integration protocol message for key press markup language language to receive a record on demand command during the mobile communication.

5. . The method of claim 1, comprising, during the mobile communication, receiving a record on demand command.

6. The method of claim 1, comprising sending from the smart client to the PBX a request for a conference call.

7. The method of claim 1, comprising deciding to record the communication after the communication has started.

8. A method for recording communications of mobile devices, the method comprising:
   receiving a notification by a smart client installed on a mobile device assigned to an organization regarding an outgoing mobile communication from the mobile device to a destination party;
   routing the outgoing mobile communication to a remote private branch exchange (PBX) of the organization;
   initiating a conference call by the remote PBX to the destination party;
   comparing by the smart client installed on the mobile device a dialed number or a dialing number associated with the mobile communication to a predefined list of telephone numbers;
   deciding by the smart client according to a policy and based on the predefined list if to record the mobile communication;
   if the mobile communication is to be recorded based on evaluation of the smart client, conferencing a recording server into the mobile communication by the remote PBX and recording media of the mobile communication received at the recording server on the recording server;
   providing a user-to-user header to the recording server containing information regarding a calling party and a direction of the mobile communication, wherein the user-to-user header is capable of encoding the direction as incoming and outgoing; and
   sending, during the mobile communication, call metadata by the PBX to the recording server the metadata comprising data regarding the call parties and the time of the call, and wherein the metadata is computer telephony integration information and sent using session initiation protocol messages.

9. The method of claim 8, further including providing a session integration protocol message containing predefined identifiers of at least one of the mobile device and a communication device being called by the mobile device.

10. The method of claim 8, further comprising inserting into the mobile communication a prerecorded announcement.

11. The method of claim 8, comprising monitoring dual tone multi-frequency signals of a session integration protocol message for key press markup language to receive a record on demand command during the mobile communication.

12. The method of claim 8, comprising, during the mobile communication, receiving a record on demand command.

13. The method of claim 8, comprising sending from the smart client to the PBX a request for a conference call.

14. The method of claim 8, comprising deciding to record the communication after the communication has started.

* * * * *